Feb. 7, 1950   G. L. WILLIAMS   2,496,836
CRANKSHAFT TORSIONAL VIBRATION DAMPER
Filed Jan. 31, 1947   3 Sheets-Sheet 3
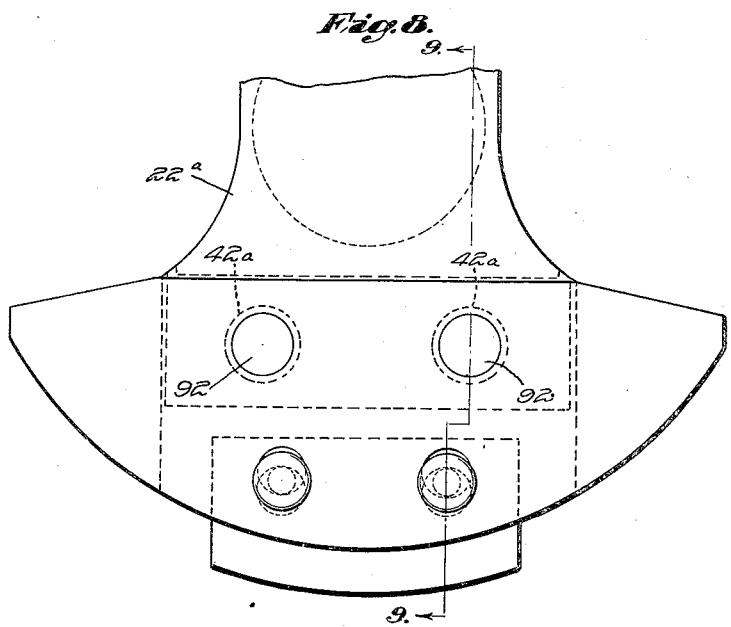
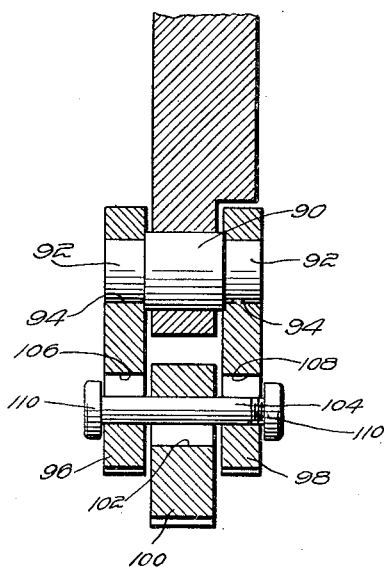
INVENTOR
George L. Williams
BY
ATTORNEY Patented Feb. 7, 1950

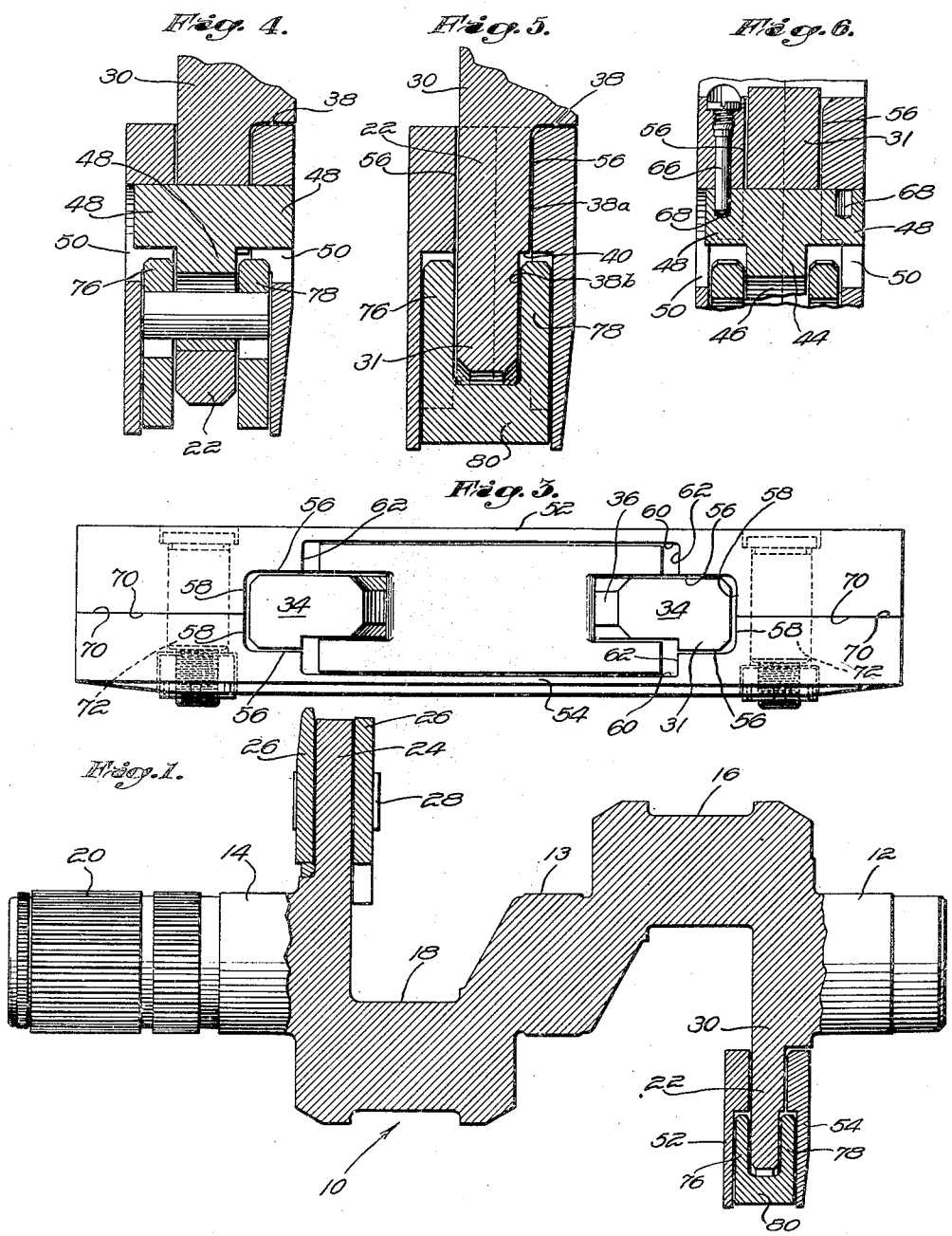

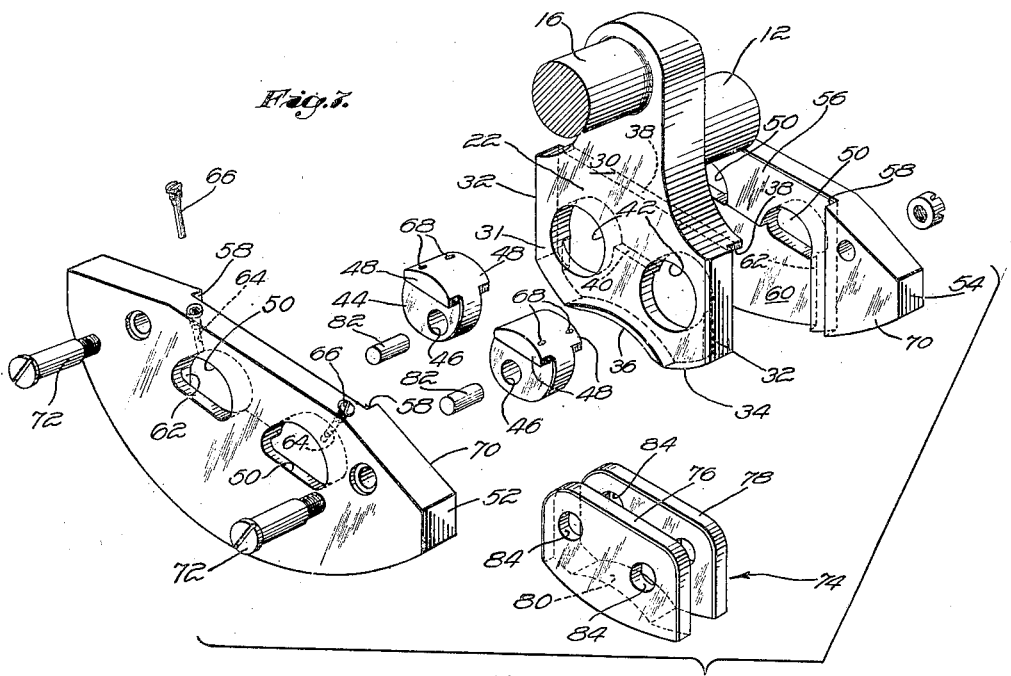
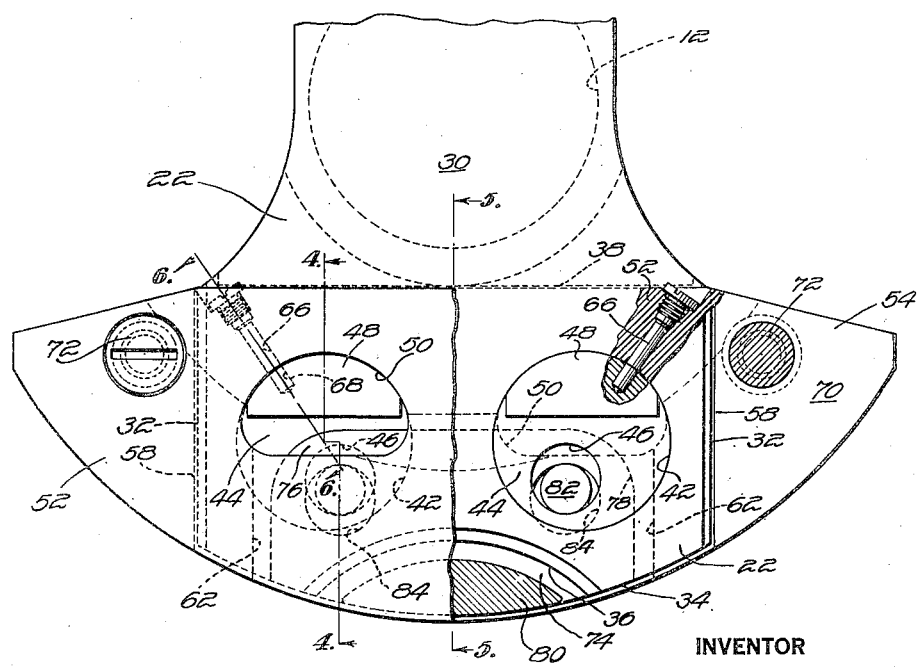

2,496,836

UNITED STATES PATENT OFFICE 2,496,836

CRANKSHAFT TORSIONAL VIBRATION DAMPER

George L. Williams, Manchester, Conn., assignor to United Aircraft Corporation, East Hartford, Conn., a corporation of Delaware Application January 31, 1947, Serial No. 725,625

13 Claims. (Cl. 74—604)

This invention relates to vibration dampers and particularly to improvements in dynamic dampers of the bifilar type commonly used for damping vibrations in the crankshafts of reciprocating engines.

Such a dynamic damper as heretofore applied to the crankshaft of a reciprocating engine comprises essentially a counterweight of relatively heavy mass supported on pins loosely engaging bores in the mass and bores in the supporting crankshaft structure. This arrangement permits the mass to swing through an arcuate path relative to its supporting structure in resonance with torsional vibrations set up in the crankshaft and has been found to control satisfactorily torsional vibrations in the shaft. However, it is frequently found after a short period of operation that the torsional damper loses its effectiveness due to the galling, or scuffing, of the pins and races.

This galling of the surfaces is believed to be caused by bending vibrations in the crankshaft resulting from deflection due to gas forces. This deflection appears as a bending movement of the crankshaft accompanied by fore-and-aft movements of the arm supporting the counterweight. This bending vibration is especially important if the combination of crankshaft stiffness and counterweight mass is such as to produce resonance with the firing frequency of a row of cylinders within the range of operating speeds of the engine. Such resonance of the crankshaft in bending may not only result in galling of the damper parts, but may result in failure of the crankshaft in bending.

An object of the present invention is to provide an improved support for a torsional crankshaft damper which avoids the aforementioned galling of the damper supporting surfaces.

Another object of the invention is to so limit the counterweight mass rigidly attached to the crank arm in its fore-and-aft direction that bending resonance will not occur in the operating range.

A further object of the invention is to provide an improved torsional damper supported on a counterweight having freedom of movement between the counterweight arm and the counterweight so that the former can move in a fore-and-aft direction in response to bending of the crankshaft while due to its own inertia the counterweight remains substantially stationary.

A further object of the invention is generally to improve the construction and performance of dynamic crankshaft dampers.

These and other objects and advantages of the invention will become apparent from the following detailed description of the accompanying drawings in which there is shown for purposes of illustration one embodiment of the invention.

In these drawings:

Fig. 1 is a side elevation, partly in section, of the crankshaft of a two-row, radial engine of the type commonly used in air craft, illustrating the improved dynamic damping means of the invention.

Fig. 2 is an enlarged end view of a radially extended crankshaft arm of Fig. 1 having the improved damping means thereon, with parts broken away and parts shown in section;

Fig. 3 is a bottom plan view of Fig. 2;

Figs. 4, 5 and 6 are sectional views taken on lines 4—4, 5—5, and 6—6, respectively, of Fig. 2;

Fig. 7 is an exploded perspective view of the damper structure and parts of the crankshaft;

Fig. 8 is a diagrammatic side elevation of a simplified form of the invention; and Fig. 9 is a vertical sectional view on line 9—9 of Fig. 8.

Referring to Fig. 1, the numeral 10 indicates generally the crankshaft of a two-row, radial engine of the air-cooled type commonly used for propelling aircraft. Crankshaft 10 has the usual axially aligned main journals 12, 13 and 14 and two diametrically opposed crank portions having connecting rod journals 16 and 18 for the two master rods (not shown) associated with the two rows of cylinders of the engine. The forward end of crankshaft 10 has external splines 20 which cooperate with a correspondingly internally splined driving member of the propeller reduction gearing or other suitable driven member.

Between the journals 12 and 16 the crankshaft is provided with a radial arm 22 extended diametrically opposite to the crank arms for the eccentric journal 16; and between journals 14 and 18 the crankshaft is provided with a radially extended arm 24 which is similarly related to the crank arms of journal 18. Arm 24 is shown as carrying a dynamic damper of conventional design comprising a weight 26 which is supported on a pair of side-by-side pins, one of which is shown at 28. Pins 28 are received loosely in bores (not shown) in arm 24 and the fore-and-aft side walls of damper 26 in a usual manner to provide for the free arcuate movement of the damper relative to the supporting arm 24. Such a damper will effectively control torsional vibrations in the crankshaft 10 unless galling of the damper parts occurs.

The improved damper of this invention is associated with the aft arm 22 on the crankshaft and not only performs the functions of a torsional damper but also suppresses excessive bending vibrations in the crankshaft and eliminates the difficulty of galling of the damper supporting parts.

Referring particularly to Fig. 7, arm 22 beyond the cheek 30 of the crankshaft gradually widens into a damper supporting portion 31 having parallel lateral edges 32 and a generally convex arcuate end 34 provided with a central concave recess 36 therein. The forward face of portion 31 constitutes a plane surface flush with the forward surface of cheek 30 while the aft face of portion 31 is cut away to provide an upper shoulder 38 and a lower shoulder 40 forming the horizontal upper limits of plane surfaces 38a and 38b respectively. Two fore-and-aft extended annular holes, or bores, 42 are provided in portion 31 in which counterweight supporting members 44 are received and freely axially slidable. Each supporting member 44 includes a central annular disc portion of the same fore-and-aft thickness as the thickness of the portion 31 below shoulder 40. Each disc portion has an eccentric hole, or bore, 46 therein and integral fore-and-aft extended shelves 48, the upper surfaces of which conform to the arcuate configuration of the central disc portion thereof. The shelves 48 provide supports for the counterweight by extending into generally semi-circular openings 50 in two complemental parts 52 and 54 of the counterweight which surrounds the portion 31 of the arm. Complemental parts 52 and 54 have confronting recesses therein having side walls 56 and end walls 58 and smaller and deeper recesses having side walls 60 and end walls 62. Part 52 also has oblique passages 64 extending through the upper arcuate surfaces of the two passages 50 into which pins, or stakes, 66 are threaded, and these stakes extend into aligned apertures 68 in the shelves 48. Counterweight parts 52, 54 also have mutually engaging abutment portions 70 through which bolts 72 extend for clamping the counterweight parts firmly together. Thus it will be noted, the supporting members 44 and counterweight parts 52, 54 are rigidly connected and act as a unit.

From Figs. 3 and 5 it will be noted that the well formed by the side walls 56 and the end walls 58 of the complemental recesses receives the supporting portion 31 loosely and that when the pins 66 are located in the aligned holes 64 and 68 a small amount of fore-and-aft movement of the counterweight comprising parts 52, 54 and their supports 44 is permitted relative to arm 22. It will also be noted that the counterweight is spaced slightly below the shoulder 38 so that the counterweight is free to move in a fore-and-aft direction relative to the arm 22 without interference.

A generally U-shaped bifilar damper 74 having side plates 76, 78 and a connecting central web portion 80 which conforms to arcuate recess 36 is suspended from the disc portions of supporting members 44 by means of hardened pins 82 which are loosely received in bores 46 in the supporting members 44 and also loosely received in bores 84 in side plates 76, 78 of the damper. The web portion 80 is such that it connects the side plate 76, 78 in such spaced relation that a clearance with respect to portion 31 is provided which is at least as great as the clearance of the counterweight relative to the arm 22.

From the above description it will be evident that the counterweight members 52, 54 and the supporting members 44 constitute a unit which is torsionally fixed relative to arm 22 but is permitted a limited amount of free fore-and-aft sliding movement relative to said arm in the direction of the axis of the holes 42. As a result, bending vibrations in the crankshaft due to the combination of bending stiffness of the crankshaft and the mass of the crankshaft counterweights are not transmitted to the counterweight.

Torsional vibrations in the crankshaft are suppressed by the pendulous movement of the bifilar damper 74, since torsional vibrations are transmitted from arm 22 directly to the counterweight supporting the damper 74. Since the counterweight does not take part in the fore-and-aft vibrations of arm 22, damper 74 may be supported in the counterweight without tendency toward galling due to fore-and-aft motion.

The particular structural arrangement shown in Figs. 1–7 by which the pendulum damper is carried directly by the counterweight supporting means is the invention of John C. Selden and is specifically claimed in the companion application, Serial No. 725,589, filed Jan. 31, 1947, now Patent No. 2,454,720 concurrently herewith.

In the modified form shown in Fig. 8 a counterweight supporting arm 22a generally similar to the arm 22 previously described has two side-by-side bores 42a in which cylindrical counterweight supporting pins 90 are freely slidable in directions parallel with the crankshaft axis. Pins 90 have reduced diameter extensions 92 which are a drive fit in holes 94 in counterweight plates 96 and 98 disposed on the fore-and-aft sides of arm 22a. In this modified form, instead of having the pendulum damper carried by the counterweight supporting members, as in the construction of Figs. 1 to 7, a light bifilar pendulum damper 100 having two bores, 102 is mounted directly on the counterweight plates, 96, 98 on two pins 104 which are loosely received in bores 102 of the damper and corresponding bores 106 and 108 in the plates 96 and 98 respectively. The pins 104 are retained in place in the plates by enlargements 110 at their opposite extremities, one of which is removably screw threaded onto each of the pins.

It will be evident that as a result of this invention a dynamic damper has been provided for an engine crankshaft which is capable of suppressing torsional vibrations while eliminating danger of scuffing, or galling, of the damper supporting surfaces.

It will further be evident that by reducing the mass which is rigidly attached to the crank arm in the fore-and-aft direction the natural frequency in bending of the crankshaft may be raised and danger of resonance in bending in the operating speed range of the engine may be avoided.

While only two embodiments of the invention have been shown and described herein it will be evident that various changes in the construction and arrangement of the parts may be made without departing from the scope of the invention as defined in the claims.

I claim:

1. In combination with a rotatable shaft which is subjected during rotation to forced bending and torsional vibrations, a relatively heavy mass torsionally fixed to said shaft for rotation therewith, means providing for relative movement of said shaft and said mass in the general direction of the axis of rotation of said shaft, and a relatively light mass mounted on said heavy mass for torsional movements at a predetermined natural frequency relative to said shaft and said heavy mass.

2. In combination, a crankshaft having an arm extended laterally from the axis of rotation thereof, counterweight means, means for supporting said counterweight means on said arm permitting relative movement between said arm and said counterweight means in directions parallel with said axis, and a torsional damper mounted on said counterweight means.

3. In combination, a crankshaft having an arm extended laterally from the axis of rotation thereof, counterweight means supported on said arm eccentrically of said axis, means supporting said counterweight means on said arm including a lost motion connection permitting movement of said arm relative to said counterweight means in directions parallel with said axis, and a torsional damper carried by said counterweight means.

4. In a crankshaft damper, an arm extended laterally from the axis of the crankshaft, a counterweight having a lost motion support on said arm permitting limited movement of said arm relative to said counterweight in directions parallel with said axis, and a bifilar torsional damper carried by said counterweight.

5. In a crankshaft damper, a counterweight mounted eccentrically of the axis of rotation of the crankshaft, said counterweight having mounting means for permitting a limited free movement of said arm relative to said counterweight in directions generally parallel with said axis, and a torsional damper carried by said counterweight.

6. In a crankshaft damper, an arm extended from the axis of the crankshaft having passage means therein extending parallel with said axis, a counterweight mounted on said arm for movement relative to said arm in directions parallel with said axis including supporting means having a sliding fit in said passage means, and a torsional damper carried by said counterweight.

7. In a crankshaft damper, an arm extended laterally from the axis of the crankshaft, and means for suppressing both torsional vibrations and destructive bending vibrations in the crankshaft, including a counterweight mounted on said arm with a lost motion connection in the direction of said axis, and a torsional damper mounted on said counterweight.

8. In a crankshaft damper for suppressing torsional vibrations, an arm extended from the crankshaft in a plane normal to the crankshaft axis having two bores therein extending parallel with said axis, counterweight means including a pair of plates embracing said arm, means for supporting said counterweight means including plate supporting members having a sliding fit in the bores of said arm, said plates embracing said arm loosely whereby to permit limited movement of said arm relative to said counterweight means in directions parallel with said crankshaft axis, and a torsional vibration damper mounted on said counterweight means.

9. In a crankshaft damper for suppressing torsional vibrations, an arm extended laterally from the fore-and-aft axis of the crankshaft having a pair of bores therein running in a direction parallel with said axis, counterweight supporting means having a sliding fit in said bores and having extensions thereon projecting fore-and-aft beyond said arm, counterweight means carried by said extensions and rigidly connected to said supporting means, said counterweight means being spaced from the fore-and-aft faces of said arm to permit a limited fore-and-aft movement of said arm relative to said counterweight means, and a torsional damper mounted on said counterweight means.

10. In a crankshaft damper for suppressing torsional vibrations, an arm extended laterally from the fore-and-aft axis of the crankshaft having a pair of bores therein running in a direction parallel with said axis, counterweight means including a pair of spaced plates embracing the extended end of said arm and a pair of plate bridging members including cylindrical portions having a sliding fit in said bores, said plates being spaced apart from the fore-and-aft faces of said arm to permit said counterweight means to remain relatively stationary during a limited fore-and-aft movement of said arm due to bending vibrations in the crankshaft, and a torsional damper supported by said counterweight means, the damper supporting means including fore-and-aft passages in said damper and in said counterweight means and pins loosely received in said passages.

11. In combination with a rotatable shaft portion which is subjected during rotation to axial and torsional vibrations, a relatively heavy mass torsionally fixed to said shaft portion for rotation therewith, means providing for axial freedom of said shaft portion relative to said heavy mass, and a relatively light damper mounted for torsional movements relative to said heavy mass and said shaft.

12. In combination, a crankshaft having an arm extended laterally from the axis of rotation thereof, counterweight means including plates on opposite sides of said arm, means for supporting said counterweight means on said arm permitting relative movement of the latter in directions parallel with said axis, and a torsional damper mounted on said plates.

13. In combination, a crankshaft having an arm extended laterally from the axis of rotation thereof, counterweight means supported on said arm eccentrically of said axis including plates on opposite sides of said arm, means supporting said counterweight means on said arm including supporting and connecting members extended through said arm and having a lost motion connection permitting movement of the latter relative to said plates in directions parallel with said axis, said plates having damper supporting bores extended therethrough in directions parallel with said axis, a torsional damper located between said plates having bores extending parallel with the bores in said plates, and damper supporting pins loosely received in the bores of said plates and said damper.

GEORGE L. WILLIAMS.

REFERENCES CITED

The following references are of record in the file of this patent:

UNITED STATES PATENTS

| Number | Name | Date |
| --- | --- | --- |
| 2,180,351 | Fischer | Nov. 21, 1939 |

FOREIGN PATENTS

| Number | Country | Date |
| --- | --- | --- |
| 768,000 | France | May 7, 1934 |